United States Patent [19]

Kondo

[11] 4,119,344
[45] Oct. 10, 1978

[54] VEHICLE SEAT BELT ASSEMBLY WITH IMPROVED BUCKLE SECTION

[75] Inventor: Iori Kondo, Kosai, Japan

[73] Assignee: Nissan Motor Company, Ltd., Japan

[21] Appl. No.: 749,463

[22] Filed: Dec. 10, 1976

[30] Foreign Application Priority Data

Dec. 11, 1975 [JP] Japan .......................... 50/167510[U]

[51] Int. Cl.² .............................................. A62B 35/00
[52] U.S. Cl. ................................. 297/385; 24/265 EE
[58] Field of Search ............... 297/385, 389; 403/210, 403/267, 266, 209; 57/149, 145, 144, 3; 24/265 EE, 265 EC, 265 BC, 265 R, 73 A, 122.3, 122.6

[56] References Cited

U.S. PATENT DOCUMENTS

| 2,736,398 | 2/1956 | Peterson | 57/145 X |
| 3,370,483 | 2/1968 | Ditlinger | 24/2 |
| 3,692,361 | 9/1972 | Ivarsson | 24/265 EE |
| 3,941,419 | 3/1976 | Blom | 297/389 |
| 3,961,011 | 1/1976 | Bramley | 264/271 |

FOREIGN PATENT DOCUMENTS 1,251,794  10/1971  United Kingdom ............... 24/265 EE

*Primary Examiner*—James T. McCall

[57] ABSTRACT

An anchor element and a buckle are interconnected by a plurality of plastic elastic filaments which are twisted about a common axis to form a single twisted strand. A solid plastic enclosure is formed integrally around the anchor element, the twisted strand and a portion of the buckle by injection molding.

8 Claims, 6 Drawing Figures

VEHICLE SEAT BELT ASSEMBLY WITH IMPROVED BUCKLE SECTION

This invention relates generally to safety seat belts for motor vehicles and like high-speed vehicles and more particularly to a buckle section of such seat belts.

In most of two or three point seat belts, the buckle section has one end anchored to the vehicle body or seat frame on one side of the seat, while the other end of the buckle section is connected to a buckle. An elongate belt section, for instance, a lap strap anchored at one end to the vehicle body or seat frame on the other side of the seat extends across the lap of the driver or occupant and at the other end is connected with the buckle of the buckle section during the use of the seat belt.

Conventionally, the buckle and the anchor element of the buckle section are connected with each other by a connecting strap made of webbing, flexible cable or wire. A connecting strap of webbing is however too flabby and therefore inconvenient in that the buckle section hangs from the seat when not in use and a user of same has to hold the buckle section with one hand while buckling the tongue of the belt section to the buckle by the other hand for fastening the belt.

A connecting strap of a relatively stiff cable or wire, having a certain elasticity, is much more convenient and facilitates the buckling operation. However, the elasticity of such wire or cable is yet insufficient to absorb impact energy resulting from a collision accident of the vehicle and can cause fatal injury of the driver or occupant wearing the seat belt.

A primary object of this invention is to provide a buckle section of a seat belt assembly which is not accompanied with the aforementioned shortcomings and drawbacks of the conventional seat belt buckle section.

Another object of this invention is to provide an improved buckle section arrangement of a seat belt which is easy and convenient to use and has a suitable elasticity to absorb impact energy which will otherwise be exerted by the seat belt on the body of the driver or occupant as in a collision of the vehicle.

Yet another object of this invention is to provide an improved buckle section arrangement of the aforementioned character which can be manufactured simply and inexpensively for practical use with common types of automotive seat belts.

Still further objects and advantages of this invention will become readily apparent to one skilled in the art to which the invention pertains upon reference to the following detailed description and accompanying drawings, in which.

Figure 1:
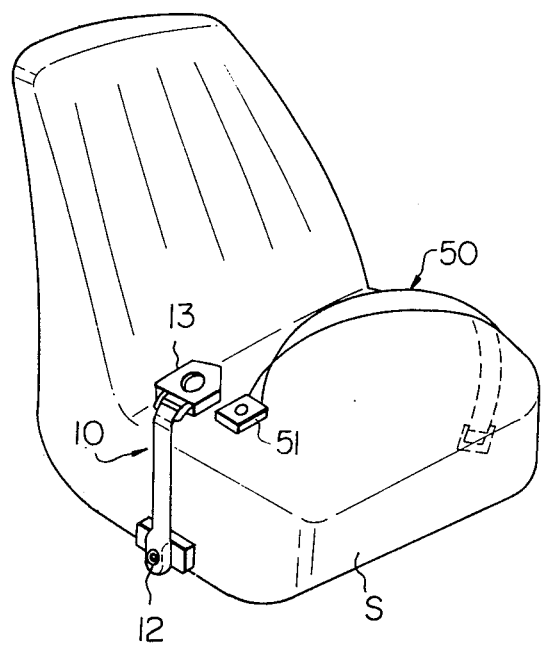
FIG. 1 is a schematic perspective view of a seat belt assembly with a buckle section according to a preferred embodiment of this invention.

The seat belt assembly schematically shown in FIG. 1 essentially consists of a buckle section 10 at one end anchored to one side of a seat frame S by means of an anchor element 12 and at the other end provided with a conventional buckle 13 with a lug 13a and a belt section 50 having one end adjacent the buckle 13 formed with a buckling tongue 51 and the other end anchored to the other side of the seat frame. The buckle section 10 is, in other words, a securing element for supporting one of the two locking parts 13, 51 of a vehicle safety harness.

Although FIG. 1 illustrates the two-point seat belt, the buckle section 10 of this invention can be utilized with a three-point seat belt or any other type of seat belt than shown in FIG. 1. For instance, the seat belt may be of the type having a buckling tongue slidable along an integral shoulder and lap belt anchored to the vehicle body through an inertia retrator so that by pulling the buckling tongue toward the buckle section, the shoulder and lap belt is fastened around the torso of the belt wearer. Also, the buckle section 10 is not necessarily anchored to the seat frame but may be fastened to the vehicle body floor, side panel or roof.

Figure 2:
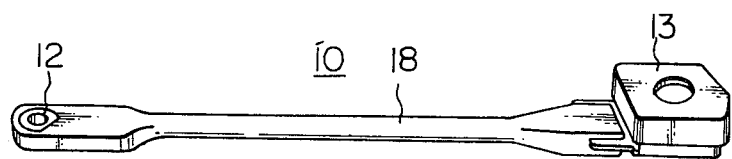
FIG 2 is an enlarged perspective view of the seat belt buckle section shown in FIG. 1.
Figure 3:
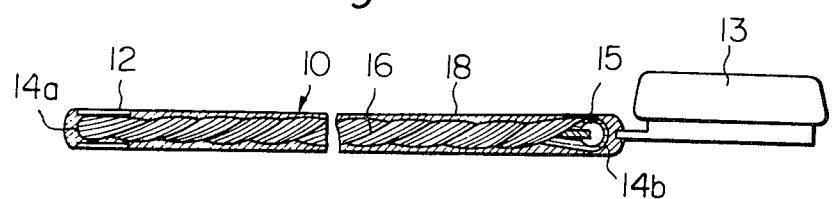
FIG. 3 is a partially sectioned view of the buckle section shown in FIG. 1.
Figure 4:
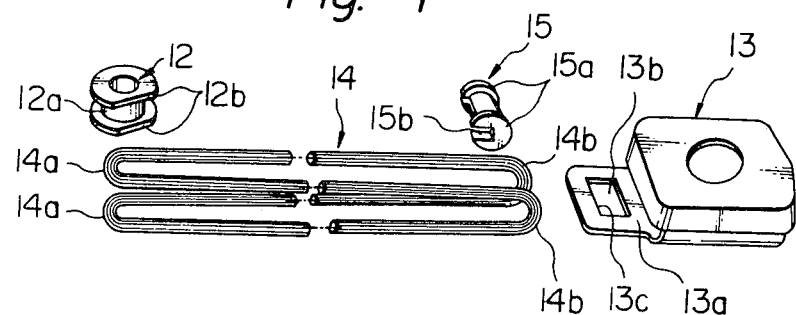
FIG. 4 is an exploded view showing the fragmentary parts of the buckle section according to a preferred embodiment of this invention.

Detailed construction and arrangement of the buckle section 10 is illustrated in FIGS 2 to 4. The anchor element 12 is of flanged spool shape in the example shown. Circular flanges on both sides of spool body 12a of the anchor element are cut away at 12b for the purpose as will be mentioned later. Extended between the anchor element 12 and the buckle 13 are two or more loop-shaped plastic filaments threads 14 which have a certain degree of elasticity. The looped filaments 14 are formed into the shape indicated in FIG. 4. Then, the looped ends 14a of the loop shaped filaments 14 are wound around the spool body 12a of the anchor element. The other looped ends 14b of the loop-shaped filaments 14 are passed through a hole 13b formed at the lug 13a of the buckle. A cylindrical protective or shield member 15 with two flanges 15a on its axial ends in provided to protect the looped ends 14b of the filaments 14 passed through the hole 13b. Specifically, the shield member 15 is formed with an elongate groove 15b extending throughout its longitudinal length in which the edge 13c of the lug carrying the looped ends 14b is fittedly received. Thus, the shield member is securely held against the lug 13c by the filament loops 14 and therefore prevents damage or breakage of the filaments due to rubbing or abrasion against the edge of the lug 13a.

The filament loops 14 connecting the buckle 13 and the anchor element 12 are then twisted about their common longitudinal axis, forming a single twisted strand 16. A solid enclosure 18 of plastic is then integrally formed around the core constituted by the anchor element 12, twisted strand 18, shield member 15 and lug 13a. The solid enclosure 18 is for instance manufactured by injection molding, although any suitable process is employable. The aforementioned cut-away portion 12b of the flanges on the anchor element obviates angular displacement of the strand 16 relative to the solid enclosure 18. By suitably selecting the thickness of the solid enclosure, the buckle section arranged as heretofore described gains both of an appropriate elasticity and stiffness.

Figure 5:
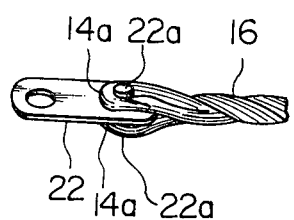
FIGS. 5 and 6 are fragmentary views illustrating design alternatives to a part of the buckle section according to this invention.

FIG. 5 illustrates a design alternative to an anchor element 12 and adjacent portion of the strand 16 shown in FIGS. 2 to 4. The anchor element in this example consists of a flat plate 22 with two pins 22a fixedly carried on the opposite surfaces thereof. The loop ends 14a are wound around the respective pins 22a on the plate 22.

Figure 6:
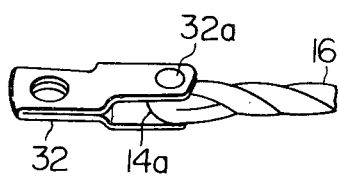

Another design alternative shown in FIG. 6 utilizes a bifurcated plate 32 with two legs as the anchor element. The legs are connected by a stud 32a around which the looped end 14a is wound in this example. Any design modification other than those referred to is possible within the scope of this invention, provided that it meets the requirement that the strand 16 is securely connected with the anchor element without displacement relative to the enclosure 18.

The buckle section of the character hereinbefore described provides a number of excellent features, several of which are exemplarily listed below.

(1) Since the buckle section is enclosed by the solid plastic enclosure from the buckle to the anchor element, the buckle section has sufficient stiffness to facilitate manipulation of the belt by the belt wearer. For the same reason, a sharp metal edge or corner of the buckle lug and anchor element does not directly contact the body of the belt wearer, obviating a possible wound on the hand or other portion of the belt wearer's body by such metal portion.

(2) The buckle section, made of flexible plastic filaments enclosed by a plastic enclosure, provides appropriate elasticity and stiffness as mentioned above. As a result, the buckle section together with the belt section elastically stretches to an appropriate extent due to a sudden impact applied thereto. This will prevent the belt wearer from being violently thrown diagonally forward during a collision.

(3) The plastic filaments are advantageously twisted. This increases a tensile strength of the buckle section because the tensile stress is uniformly disturbuted throughout the length of the twisted strand. This feature is obviulsy pronounced in comparison with a mere bundle of filaments not twisted and assures a prolonged life of the buckle section.

(4) Since the filaments are twisted to form a single strand, the filaments are not separated nor entangled during injection molding of the plastic enclosure.

(5) The plastic enclosure is integrally formed with the twisted strand, buckle lug and the anchor element, so that the buckle section as a whole is made neat and compact. This also results in facilitated mounting of the buckle section to the vehicle body or seat.

(6) Elasticity of the twisted strand is greater than that of the solid plastic enclosure. It follows that the plastic enclosure is cracked or broken prior to the twisted strand when an abnormal tensile stress is applied to the buckle section. The belt wearer is aware of the damage to the buckle section at a glance and is able to obviate the danger of continuously using the disabled seat belt.

It is to be understood that various changes and revisions can be made therein with further advantages and features other than above without departing from the spirit of the invention as expressed in the scope of the appended claims.

What is claimed is:

1. In a vehicle safety seat belt, a buckle section comprising,
    an anchor element at one end of the buckle section to be fastened to a fixed part of the vehicle body,
    a buckle at the other end of the buckle section with a lug portion,
    a single twisted strand connected between said anchor element and said lug portion of the buckle, said twisted strand being formed by connecting said anchor element and the lug portion of said buckle with plastic threads and thereafter twisting the threads together about the longitudinal axis thereof by rotating said anchor element relative to the lug portion of said buckle, and
    a solid plastic enclosure integrally formed around said anchor element, twisted strand and lug portion.

2. A method for making a buckle section of a vehicle safety seat belt, comprising
    connecting with plastic threads an anchor element and the lug portion of a buckle,
    twisting the threads about the longitudinal center axis thereof to form a single twisted strand by rotating said anchor relative to the lug portion of said buckle, and
    forming integrally a solid plastic enclosure around said anchor element, said twisted strand and the lug portion of said buckle.

3. A method for making a buckle section of a vehicle safety seat belt, comprising
    forming plastic threads into the shape of a loop,
    connecting with loop-shaped an anchor element and the lug portion of a buckle,
    twisting said loop-shaped threads about the longitudinal axis thereof to form a single twisted strand by rotating said anchor relative to the lug portion of said buckle, and
    forming integrally a solid plastic enclosure around said anchor element, said twisted strand and the lug portion of said buckle.

4. A buckle section according to claim 1, in which said plastic enclosure is formed by injection molding.

5. A buckle section according to claim 1, in which said anchor element includes a flange spool around which the looped ends of said filaments are wound.

6. A buckle section according to claim 1, in which said anchor element includes an elongate plate having two pins on the opposite faces thereon, around which the looped ends of said filaments are wound.

7. A buckle section according to claim 1, in which said anchor element includes a bifurcated plate having two legs and a stud connected to and extending between said two legs around which said looped ends of said filaments are wound.

8. A buckle section according to claim 1, comprising a shield element mounted on the lug portion to protect the looped ends of said filaments from rubbing against the lug portion.

* * * * *